Dec. 16, 1924.
M. HALLANAN
TRACTION DEVICE FOR DUAL TIRED WHEELS
Filed Dec. 7, 1923
1,519,834
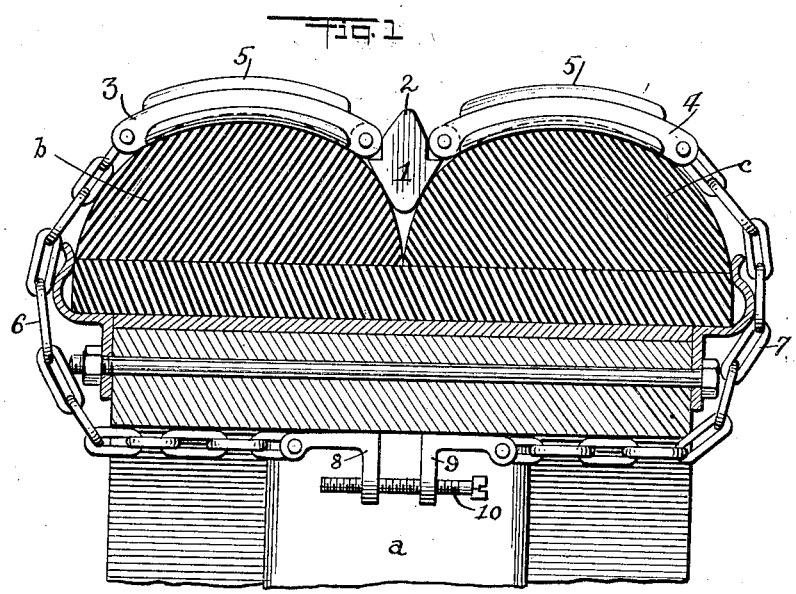
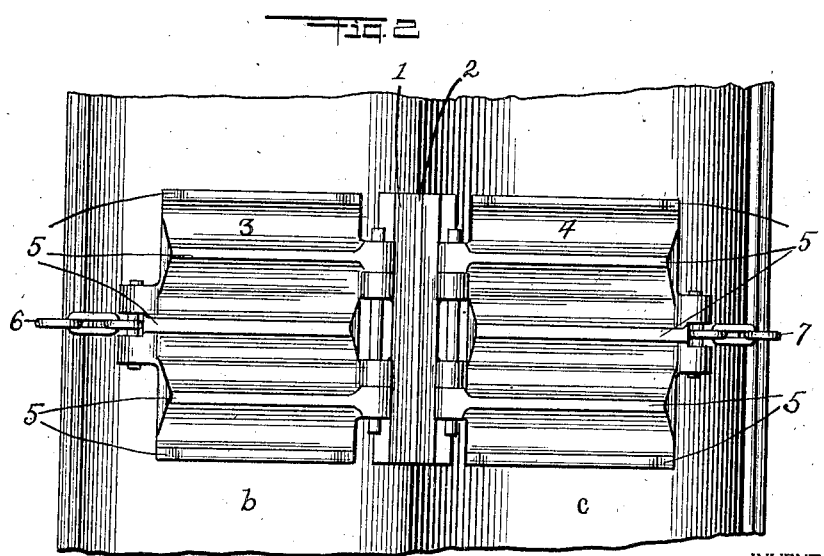
INVENTOR
Michael Hallanan
BY
Robert B. Kilgore
ATTORNEY Patented Dec. 16, 1924.

1,519,834

UNITED STATES PATENT OFFICE.

MICHAEL HALLANAN, OF NEW YORK, N. Y.

TRACTION DEVICE FOR DUAL-TIRED WHEELS.

Application filed December 7, 1923. Serial No. 679,136.

*To all whom it may concern:*

Be it known that I, MICHAEL HALLANAN, a citizen of the United States, residing at New York city, in the county of New York and State of New York, have invented certain new and useful Improvements in Traction Devices for Dual-Tired Wheels, of which the following is a specification.

My invention relates to detachable traction devices for dual tire motor truck wheels and it is my object to produce an efficient device which can be easily and quickly applied to and removed from the wheel, which will fit new or worn tires and tires of different sizes and which can be produced at a low cost.

In the drawing Fig. 1 is a view, partly in section, of my device on a wheel; and Fig. 2 a plan view of the face of my device.

In Fig 1 the usual wheel $a$ has dual tires $b$ and $c$ mounted thereon. My device consists of a center piece 1 adapted to lie between the tires $b$ and $c$ and is provided with a rib 2. Hinged to this center piece on either side thereof are bearing plates 3 and 4, each provided with ribs 5 transversely arranged with respect to the center piece rib 2.

Attached to the outside edges of the bearing plates 3 and 4 are fastening devices, chains 6 and 7 being shown. The free ends of these chains carry clamping pieces 8 and 9 and a clamping bolt 10 passes through one and engages the other of these clamping pieces.

In use the device is laid over the tires with the center piece between them and a bearing plate on the tread of each tire. The chains are passed under the felloe and the bolt inserted and drawn up until the device is solidly anchored to the wheel. A plurality of these devices are generally placed on each wheel and this can be done easily and quickly without jacking up the wheel. As the surfaces in contact with the tires are smooth no damage to the rubber can result from continued use of the device.

The flexibility of the device, due to the three piece, hinged joint construction enables it to fit new or worn tires and tires of different sizes while the chain and plate retaining device enables it to fit wheels of different sizes.

The transverse ribs on the plates take a solid grip in snow, mud or sand and enable a stalled car to pull out under its own power while the rib on the center piece tends to reduce skidding.

As but three drop forgings are used in the production of the device, namely, the center piece, the bearing plates in duplicate and the clamping pieces in duplicate it can be manufactured and sold at a low price.

I claim:—

1. A traction device for dual tired wheels comprising a center piece adapted to lie between tires in contact therewith and adapted to engage the road surface to prevent side slip, bearing plates hinged to the center piece on either side thereof and adapted to lie on the treads of tires and means for securing the device to a wheel.

2. A traction device for dual tired wheels comprising a ribbed center piece adapted to lie between tires, bearing plates hinged to the center piece on either side thereof adapted to lie on the treads of tires and ribbed transversely on their outer faces with respect to the center piece rib and means for securing the device to a wheel.

In testimony whereof I have affixed my signature.

MICHAEL HALLANAN.